United States Patent [19]

Cooper

[11] 4,131,510
[45] Dec. 26, 1978

[54] MAGNETIC NUCLEAR CORE RESTRAINT AND CONTROL

[75] Inventor: Martin H. Cooper, Monroeville, Pa.

[73] Assignee: The United States of America as represented by the United States Department of Energy, Washington, D.C.

[21] Appl. No.: 808,574

[22] Filed: Jun. 21, 1977

[51] Int. Cl.² .............................................. G21C 7/30
[52] U.S. Cl. ...................................... 176/50; 176/40; 176/87
[58] Field of Search .................... 176/40, 87, 85, 50

[56] References Cited

U.S. PATENT DOCUMENTS

| 3,629,070 | 12/1971 | Stankiewicz | 176/85 |
| 3,708,393 | 1/1973 | Waymire et al. | 176/85 |

FOREIGN PATENT DOCUMENTS

| 608030 | 11/1960 | Canada | 176/85 |
| 921699 | 3/1963 | United Kingdom | 176/85 |

Primary Examiner—Harvey E. Behrend
Attorney, Agent, or Firm—Edward L. Levine; Z. L. Dermer

[57] ABSTRACT

A lateral restraint and control system for a nuclear reactor core adaptable to provide an inherent decrease of core reactivity in response to abnormally high reactor coolant fluid temperatures. An electromagnet is associated with structure for radially compressing the core during normal reactor conditions. A portion of the structures forming a magnetic circuit are composed of ferromagnetic material having a curie temperature corresponding to a selected coolant fluid temperature. Upon a selected signal, or inherently upon a preselected rise in coolant temperature, the magnetic force is decreased a given amount sufficient to relieve the compression force so as to allow core radial expansion. The expanded core configuration provides a decreased reactivity, tending to shut down the nuclear reaction.

5 Claims, 7 Drawing Figures

MAGNETIC NUCLEAR CORE RESTRAINT AND CONTROL

BACKGROUND OF THE INVENTION

The invention described herein was made in the course of, or under, a contract with the United States Energy Research and Development Administration, the successor in interest to the United States Atomic Energy Commission.

FIELD OF THE INVENTION

This invention relates to nuclear reactors and more particularly to a system for laterally restraining, compressing, and expanding the core of a reactor.

DESCRIPTION OF THE PRIOR ART

Throughout the history of nuclear reactor design extreme care has been taken to ensure safe, reliable, and redundant shutdown and hypothetical accident controls. Typical of such controls are, for example, control rods maintained in an upper position by electromagnets which, upon loss of electrical power, drop the rods into the reactor core. Such devices have proved to be extremely reliable. They do, however, require some type of signal, or a loss of power, to position the control rods within the core. The signal can be in response to a multitude of continuously monitored plant parameters.

It is particularly desirable to provide control mechanisms which respond directly to selected plant parameters. Such mechanisms can be referred to as "inherent" controls or shutdown systems. The most typical of these control mechanisms is the negative moderator coefficient experienced by many pressurized water cooled reactors upon a rising coolant temperature. This phenomenon, however, is not realized in many other reactor types.

In view of the conservative design approach attendant the nuclear industry, it is desirable to provide additional inherently safe control mechanisms, applicable to a broad range of nuclear reactors.

SUMMARY OF THE INVENTION

This invention provides an inherently responsive control mechanism and core restraining device for fluid cooled nuclear reactors. It is based upon the nuclear characteristic that expanding the geometry of a core in response to an undesirable condition will decrease the reactivity of the core, and can place it in a subcritical configuration.

The invention includes an electromagnetic circuit through ferromagnetic structure arranged to radially compress core fuel assemblies adjacent one another for normal plant operating conditions. An electromagnet can act upon the structure which compresses the core, and can also form an electromagnetically induced circuit incorporating adjacent core assemblies. Between the adjacent assemblies are desirably provided compressible Belleville-type springs which are compressed during normal operation and relaxed upon a selected signal or accident condition by decreasing the electromagnetic force.

The invention further includes an inherent shutdown mechanism when a portion of the electromagnetic circuit is made of a ferromagnetic material which has a predetermined curie temperature and which is in heat transfer relation with the reactor coolant fluid exiting the core. Upon an accidental rise in the coolant temperature resulting in raising of the ferromagnetic material to a temperature at which the magnetic saturation decreases, the electromagnetic force is inherently reduced, allowing the adjacent assemblies and core to radially expand. The expanded configuration decreases the reactivity of the core, leading to a controlled shutdown.

BRIEF DESCRIPTION OF THE DRAWINGS

The advantages, nature and additional features of the invention will be better understood from the following description, taken in connection with the accompanying drawings, in which.

DESCRIPTION OF THE PREFERRED EMBODIMENTS

Figure 1:
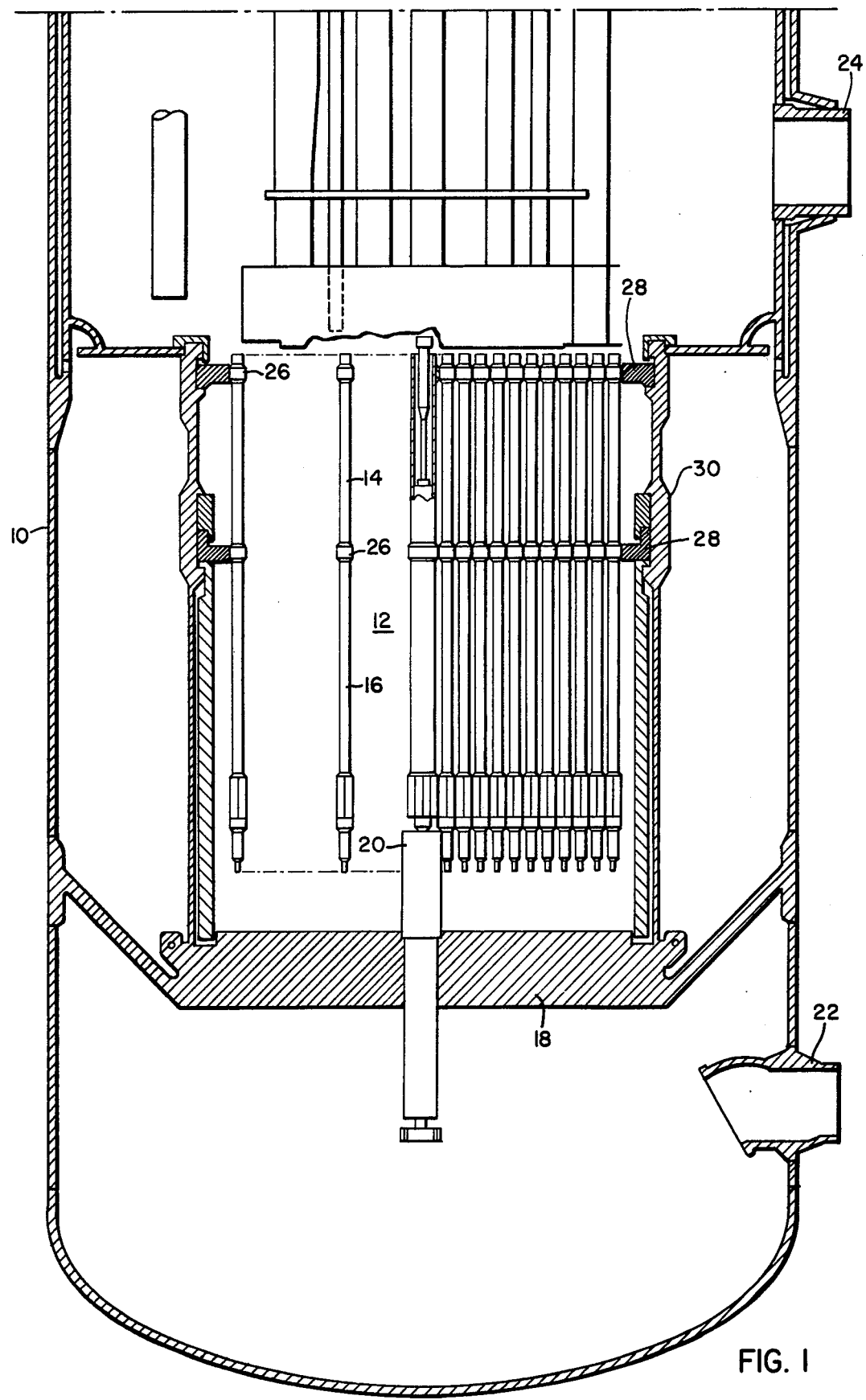
FIG. 1 is an elevation view, partially in section, of one type of reactor to which the invention can be applied.

Referring now to FIG. 1 there are shown portions of a reactor of the liquid metal fast breeder type. The reactor includes a vessel 10 housing a nuclear core 12. The core 12 includes a plurality of substantially vertical and coextending fuel elements 14. The fuel elements 14 shown are of the ducted type, having a duct 16 and a plurality of internally contained fuel rods (not shown) which can include both fertile and fissile fuels as well known in the art. The core elements are supported upon a perforated lower core plate 18 either directly or through a plurality of modules 20, and are typically arranged to approach the configuration of a right circular cylinder.

The main flow of a reactor coolant fluid such as liquid sodium or water enters the vessel through inlet nozzles 22, flows upwardly through the plate 18 and within the duct 16, and is discharged through outlet nozzles 24. The heat energy imparted to the coolant passing through the core is typically transferred in apparatus, not shown, ultimately for the purpose of electrical power generation.

Each fuel element duct includes lateral load pads 26 at given elevations which abut against the load pads 26 of adjacent assemblies. Lateral core support has typically been provided by restraints 28 about the core radial periphery. The restraints are supported by a radial core structure 30. This invention addresses, among other items, improved restraints.

Figure 2:
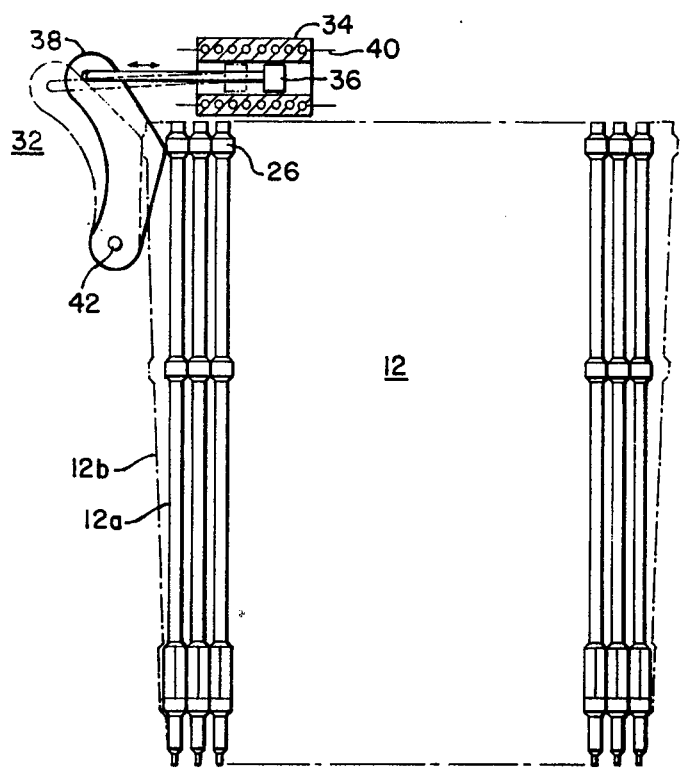
FIG. 2 is a schematic, in elevation of one embodiment of the invention disclosed herein.

The invention, applicable to the exemplary reactor shown or other reactors and core types, can best be understood by reference to FIG. 2. Shown in the figure are a core 12 having aligned load pads 16, and a lateral restraint and control system 32. The system includes an electromagnet 34, an armature 36, and a movable restraint 38 connected to the armature. The electromagnet 34 is powered through leads 40 from a source preferably external to the reactor vessel. The electromagnet 34 is desirably made of a material having a predetermined curie temperature so that a selected amount of its magnetic capacity is reduced at a specified temperature rise above the normal operating temperature. The electromagnet 34 is also positioned so that the flow of reactor coolant exiting the core is in thermal contact with the electromagnet or other selected components included in a magnetic circuit.

It is well known that the criticality of a core is dependent upon the density or geometric configuration of the nuclear fuel. The apparatus shown in FIG. 2 provides means for inherently altering the core geometry in response to an undesirable coolant temperature rise. During normal operation the electromagnet 34 is energized and provides sufficient force to position the armature 36 and affixed restraint 38 so as to radially compress the core 12 as shown by the solid core outline 12a. One or more restraint systems 32 can be utilized. Upon an abnormal rise in coolant temperature to a preselected temperature range, the temperature of the armature 36 is raised to the predetermined temperature range at which a selected amount of the compressing force is relaxed. Accordingly, the restraint 38 freely moves about a pivot 42, allowing the core 12 to radially expand as shown by the dotted outline 12b. The expansion in core geometry will serve to shutdown the nuclear reaction. The expansion can be allowed to propagate throughout the entire core, or merely along selected radii or segments. Also, restraints can be utilized at various elevations, allowing broad expansion along the entire core height.

Figure 3:
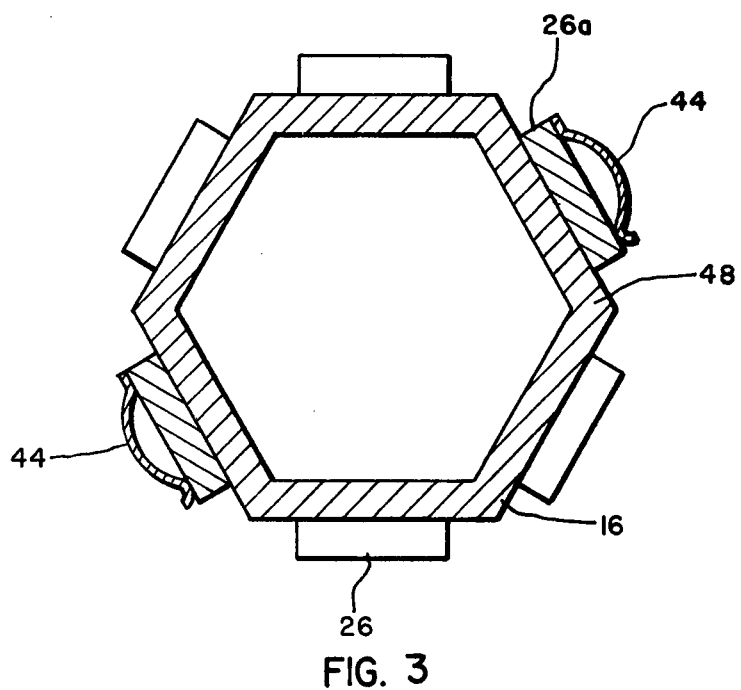
FIG. 3, is a plan view, in section, of a fuel element outer duct in accordance with this invention.

Arrangements of many types can be utilized to allow or assist expansion upon relieving of the compressing force. For example, FIG. 3 shows a cross section of an hexagonal fuel element duct 16 having load pads 26 at various elevations. The pads 26a are provided with compressible means, such as Belleville or other type springs 44, which are compressed or relaxed as the case may be between adjacent fuel elements 14. Alternatively, axial support of the elements 14 can be arranged to accommodate the expansion. For example, the elements can be pinned into the lower core plate 18 at a spacing which accommodates sufficient radial expansion at the upper portions of the core. Dependent upon the height and type of elements, and the core configuration, approximately a one inch radial expansion across the active core can provide a sufficient change in reactivity for control purposes. The bending required in each individual assembly under such conditions can be reconciled without unduly stressing the assemblies and contained fuel rods, as well as allowing insertion of control rods 46 (FIG. 1). Also, the control rods can be located to enter elements 14 in the core at positions not directly affected by the expansion by using elongated guide ducts for the control rods, and the electromagnet can also be associated with other reactor monitoring and control equipment so that electric power to the magnet can be terminated in response to any abnormal condition, allowing the core to expand.

Figure 4:
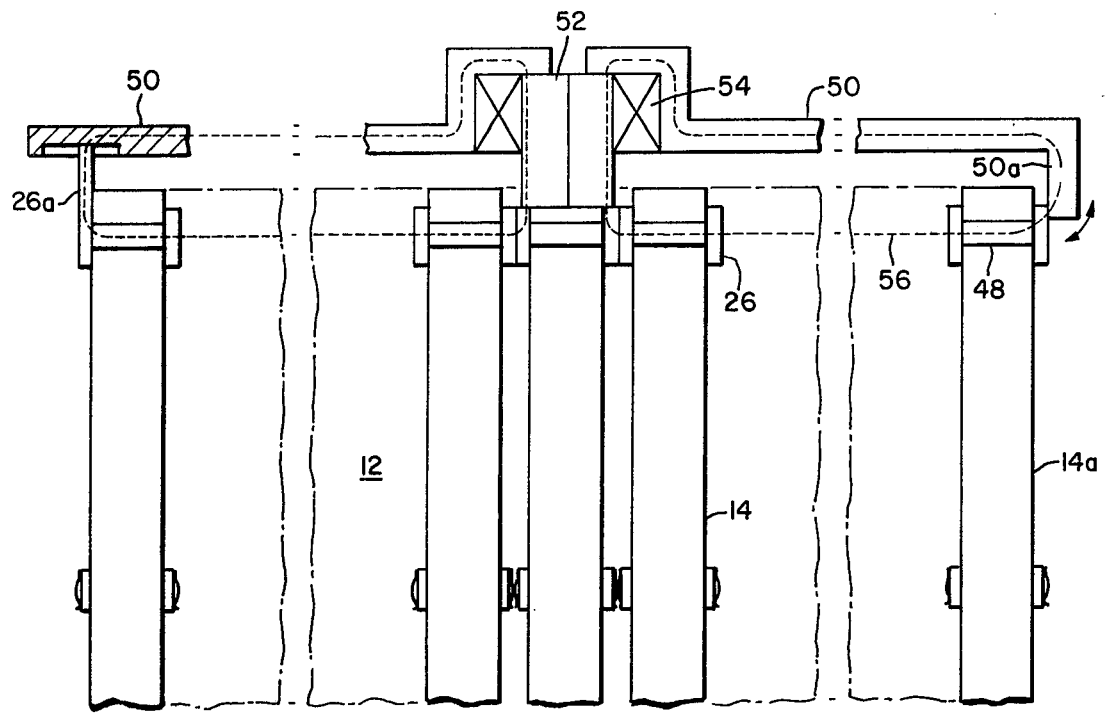
FIG. 4 is a schematic, in elevation, of another embodiment.

Another embodiment is illustrated in FIG. 4. Here, selected load pads 26 and portions 48 of the elements 14 are comprised of ferromagnetic material, as is a magnetic circuit conducting beam 50. The beam 50, exposed to the coolant fluid exiting the core, can be an alloy having a predetermined curie temperature, such as those including compositions of iron and nickel or iron and chromium. It should be noted that components within a typical reactor vessel are composed of 316 stainless steel, Inconel, or other high strength and high temperature materials, which are non-magnetic. In conjunction with the ducts, pads and beam, a magnetic circuit is formed through a magnetic core 52 by coils 54. Although differing compositions may be used, the magnetic core 52 is preferably comprised of iron, shielded from direct contact with the coolant, and the coils of nickel-plated silver encased in a high temperature insulation such as $Al_2O_3$. The beam 50 can take many geometric configurations ranging from a perforated plate above the core to a plurality of webs or plates along selected core radii. The beam must form part of a magnetic circuit, as indicated by the broken line 56, and preferably contacts a peripheral element 14a through a bending component 50a or a sliding motion. For sliding motion, an upwardly extended outer pad 26a can be utilized which slidingly contacts the beam 50.

The embodiment can be utilized with elements 14 of the type shown in FIG. 3, where only selected load pads (26a) and portions 48 of the duct are composed of a ferromagnetic material, and other load pads are non-magnetic.

Figure 5:
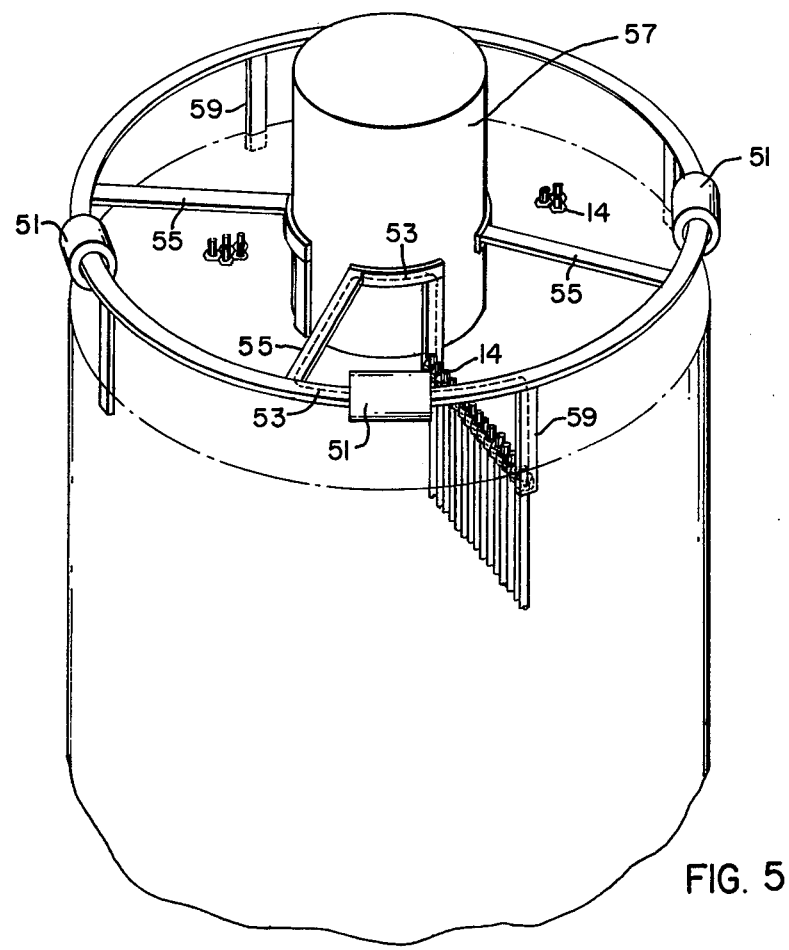
FIG. 5 is a simplified perspective view of yet another embodiment.

The coils 54 producing the magnetic flux can be controlled by other reactor safety mechanisms, as discussed hereinabove, and the magnetic force advantageously can similarly be decreased by a rise in coolant temperature. It is estimated that the ferromagnetic curie temperature alloys utilized for the beam, and/or for the pads or portions of the ducts, can be selected such that the attractive compressing magnetic force falls approximately thirty to fifty percent upon a one-hundred to two-hundred Fahrenheit degree rise in the normal coolant outlet temperature. The resulting core expansion can provide sufficient negative reactivity to shutdown the reactor. A similar embodiment is shown in FIG. 5. Here a plurality of electromagnets 51 each form a magnetic flux path 53 through temperature sensitive struts 55, an upper internals shroud 57, the fuel elements 14, and a flexible structure 59. The magnetic material, or portions thereof, can be removed during refueling operations.

Figure 6:
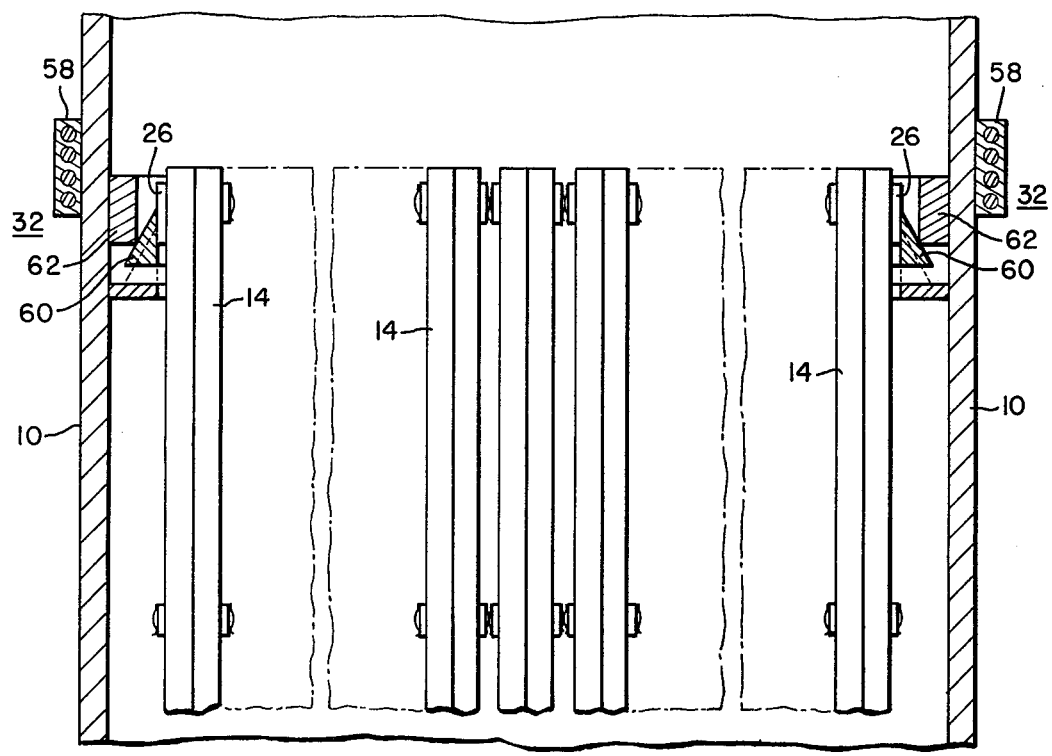
FIGS. 6 and 7 are elevation views of alternate embodiments of the invention.

Many other arrangements may be utilized incorporating the inventive teachings. For example, FIG. 6 shows a restraint and control system in which an electromagnet 58 is positioned external to the reactor vessel 10. A tapered ring 60 of ferromagnetic material is supported between a fixed pad 62 and the lateral load pads 26 on the peripheral fuel elements 14. The fixed pads 62 can be affixed to the vessel wall, the radial core structure 30, or other support structures within the vessel 10. The ring 60 can be comprised of a material having a predetermined curie temperature. The ring, as shown, can be located below the top of the fuel elements 14, but is positioned in heat transfer relation with the flowing coolant. Upon energizing the electromagnet 58, an upward magnetic force is produced upon the ring, which radially compacts the core as a result of its tapered configuration.

Figure 7:
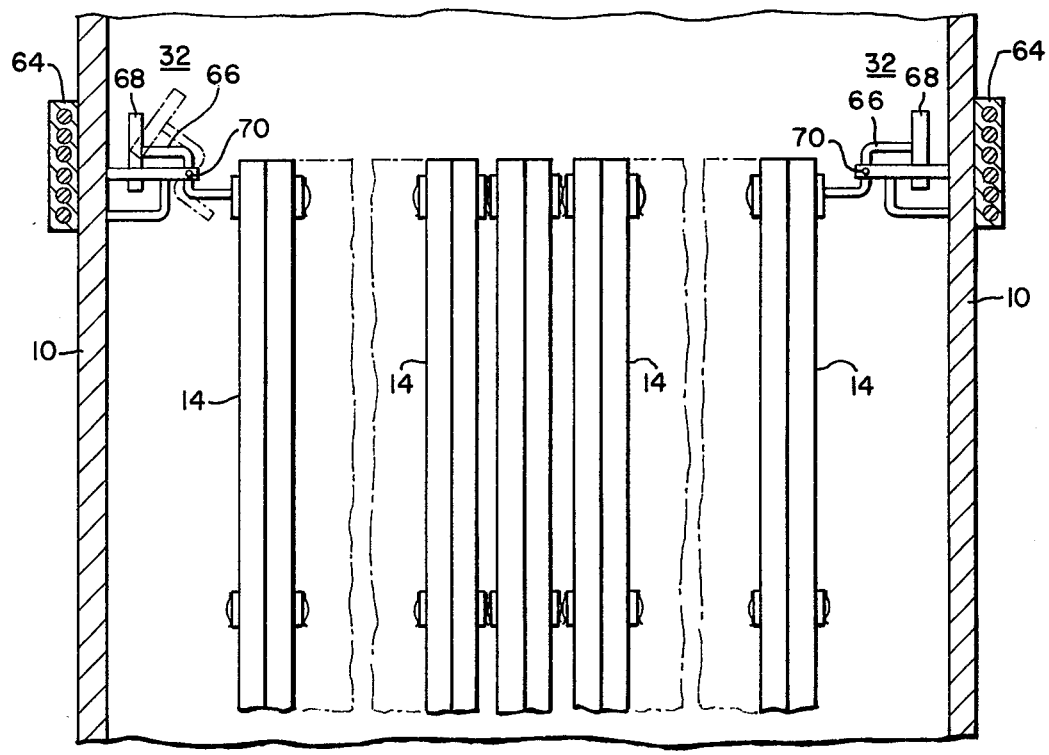

Yet, another exemplary restraint and control system 32 is shown in FIG. 7, also incorporating an electromagnet 64 located external to the vessel 10. In this arrangement compaction forces for core lateral restraint are provided by a number of pivoted arms 66 spaced at selected intervals about the core periphery. Each arm is connected to a selected curie temperature armature 68 which is laterally moved by the magnetic force provided by the electromagnet. Radially outward motion of the armature is translated into a radially inward force on the core through the motion of the arm 66 about a pivot 70. The pivot 70 is supported by the vessel or other reactor internals structures. To provide inherent operation in response to a coolant temperature rise, coolant flow patterns must be sufficient to bathe the armature 68 in coolant exiting the core, and additional flow control structures can be provided for this purpose.

Selection of the materials and associated curie temperatures will vary dependent upon the reactor type and its operating parameters. In all cases, however, the curie temperature chosen is preferably higher by a suitable margin than the normal core outlet coolant temperature in order to preclude inadvertent deactivation of the compressing force upon the core. Some candidate ferromagnetic materials are listed in Table I which are applicable to the operating temperature range of many existing reactor types.

TABLE I

| Material | Curie Temperature | |
|---|---|---|
| | °C | °F |
| Iron | 770 | 1480 |
| Silicon-Iron | 690 | 1274 |
| Grain-Oriented Si-Fe | 740 | 1364 |

For liquid metal cooled fast breeder reactors with a mixed core outlet temperature in the range of 900° to 1200° F., (482° to 649° C.) promising candidate materials also include iron-nickel and iron-chromium alloys.

There has therefore been described a nuclear core restraint and control system inherently operable for control purposes upon a preselected rise in reactor coolant fluid temperature. Although described primarily in relation to a liquid metal cooled fast breeder reactor having ducted assemblies, it is to be understood that the various embodiments and teachings of the invention are applicable to other reactor and core designs, including those with open lattice or grid-type elements. If desirable to have such elements included as part of the magnetic circuit, such as described in reference to FIG. 4, adjacent grids or supplementary structures can easily be so adapted. It will be apparent that many additional modifications are possible in view of the above teachings. It therefore is to be understood that within the scope of the appended claims the invention may be practiced other than as specifically described.

What is claimed is:

1. A nuclear reactor comprising a fluid coolant circulated through a core supported within a reactor vessel, said core including a plurality of substantially vertical coextending fuel assemblies, at least some of said assemblies having a compressible structure laterally interposed therebetween in a compressed configuration at selected operating conditions, and means for selectively relieving compression of said structure upon a preselected temperature of said coolant so as to laterally displace portions of said core, said means including electromagnetic restraint structure having a curie temperature with a predetermined relation to said preselected temperature, said restraint structure positionable to laterally compact said core and compress said compressible structure in response to a coolant temperature below said preselected temperature and inherently positionable to allow lateral expansion of said core and compressible structure in response to a coolant temperature above said preselected temperature.

2. The reactor of claim 1 wherein said electromagnetic restraint structure comprises an electromagnet and a cooperatively associated ferromagnetic restraint having a curie temperature with a predetermined relation to said preselected temperature, said ferromagnetic restraint positionable by said electromagnet to laterally compact said core and compress said compressible structure in response to a coolant temperature below said preselected temperature and inherently positionable to allow lateral expansion of said core and compressible structure in response to a coolant temperature above said preselected temperature.

3. The reactor of claim 1 wherein said electromagnetic restraint structure comprises an electromagnet having said curie temperature.

4. The reactor of claim 1 wherein said electromagnetic restraint structure comprises a restraint pivotally movable to effect said lateral compaction and lateral expansion of said core.

5. The reactor of claim 1 wherein said electromagnetic restraint structure comprises a tapered member vertically movable to effect said lateral compaction and lateral expansion of said core.

* * * * *